United States Patent [19]
Kennan et al.

[11] Patent Number: 5,731,379
[45] Date of Patent: Mar. 24, 1998

[54] COPOLYMERS OF POLYORGANOSILOXANE, POLYISOBUTYLENE, AND ALKYL ACRYLATES OR METHACRYLATES

[75] Inventors: Linda Denise Kennan; Peter Yin Kwai Lo; Anil Kumar Saxena; Toshio Suzuki, all of Midland, Mich.

[73] Assignee: Dow Corning Corporation, Midland, Mich.

[21] Appl. No.: 779,857

[22] Filed: Jan. 3, 1997

[51] Int. Cl.$^6$ ........................................ C08L 43/00
[52] U.S. Cl. ...................... 524/806; 524/837; 526/279
[58] Field of Search ...................... 526/279; 524/806, 524/837

[56] References Cited

U.S. PATENT DOCUMENTS

| | | | |
|---|---|---|---|
| 3,419,593 | 12/1968 | Willing | 260/448 |
| 4,533,254 | 8/1985 | Cook | 366/176 |
| 5,371,147 | 12/1994 | Spinelli et al. | 526/279 |
| 5,387,632 | 2/1995 | Lai et al. | 526/279 |

OTHER PUBLICATIONS

Journal of Applied Polymer Science, vol. 43, pp. 1059–1066, 1991.
Journal of Polymer Science, vol. 21, pp. 1033–1044, 1983.
J.M.S., Pure Applied Chem., A33 (2), pp. 117–131, 1996.

*Primary Examiner*—Melvyn I. Marquis
*Attorney, Agent, or Firm*—James L. De Cesare

[57] ABSTRACT

Method of making copolymers of (i) an acrylic or methacrylic-functional polyisobutylene macromonomer, (ii) a polydiorganosiloxane macromonomer, and optionally (iii) a radical polymerizable monomer such as an alkyl acrylate or alkyl methacrylate. The copolymers are prepared by copolymerizing the monomers in a miniemulsion using a free radical initiator at high temperature. In the method, the monomers are mixed with a surfactant(s) and optionally a cosurfactant(s), and subjected to high shear.

12 Claims, No Drawings

COPOLYMERS OF POLYORGANOSILOXANE, POLYISOBUTYLENE, AND ALKYL ACRYLATES OR METHACRYLATES

BACKGROUND OF THE INVENTION

This invention is directed to miniemulsion polymerization of (i) an acrylic or methacrylic-functional polyisobutylene (PIB) macromonomer, (ii) a polydiorganosiloxane macromonomer, and optionally (iii) a radical polymerizable monomer such as an alkyl acrylate or alkyl methacrylate.

Emulsion polymerization is an important industrial method, because it produces high molecular weight polymers, and because there is no or negligible content of volatile organic compounds (VOC). In a normal emulsion polymerization technique, the oil is emulsified in water with a conventional surfactant using a mechanical shearing device, to produce droplets of 1,000–10,000 nanometers (nm) in diameter. The polymerization is achieved with the assistance of a water or oil soluble initiator or catalyst. These emulsions are generally opaque, milky, and viscous; but they can also be translucent emulsions with particle sizes ranging from about 8–80 nm, when a very high surfactant concentration is employed.

In such conventional emulsion polymerization, the micelles are the primary site for polymerization. However, El-Aasser et al in the *Journal of Applied Polymer Science*, Volume 43, Pages 1059–1066, (1991), show that nucleation can also occur in monomer droplets if they are very small. They termed this phenomenon "miniemulsion polymerization", with particle sizes ranging from 50–500 nm. According to El-Aasser et al, the miniemulsions are more stable compared to conventional emulsions; they have small particle size, i.e., 50–500 nm. High shear devices such as a submicron disperser, a MICROFLUIDIZER®, or an ultrasonication unit can be used to make the miniemulsion.

According to their technique, a cosurfactant is employed, which is typically a low molecular weight, water insoluble compound, such as cetyl alcohol or hexadecane. It is used for the purpose of retarding the diffusion of the monomer out of the droplets. They postulate that the stability of such acetyl alcohol system can be attributed to the formation of intermolecular complexes at the oil/water interface, resulting in lower interfacial tension.

El-Aasser et al do not describe the copolymerization of an acrylic or methacrylic-functional polyisobutylene macromonomer, a polydiorganosiloxane macromonomer, and optionally an alkyl acrylate or alkyl methacrylate. We are not aware of any published report on the copolymerization of such monomers. Where there is reference to polymerization of macromonomers, the references are focused toward copolymerization of non-silicon atom containing macromonomers with conventional low molecular weight monomers, i.e., *Journal of Macromolecular Science*, Pure Applied Chemistry, Aniko Takacs & Rudolf Faust, A33(2), Pages 117–131, (1996); and *Journal of Polymer Science*, Polymer Chemistry Edition, Joseph P. Kennedy & Misao Hiza, Vol. 21, Pages 1033–1044, (1983). In particular, these references only relate to the preparation of poly(methyl methacrylate-graft-isobutylene) copolymers, i.e., PMMA-g-PIB; and neither disclose copolymers of a polyisobutylene macromonomer, a polydiorganosiloxane macromonomer, and optionally a radical polymerizable monomer such as an alkyl acrylate or alkyl methacrylate. In addition, both references use solution polymerization rather than a miniemulsion polymerization technique.

BRIEF SUMMARY OF THE INVENTION

Our invention relates to a method of making a copolymer in an emulsion by heating and shearing a reaction mixture formed by combining (i) water; (ii) an anionic surfactant, a cationic surfactant, a nonionic surfactant, or a combination thereof; optionally (iii) a cosurfactant which is a hydrophobic solvent, or a compound having low water solubility, such as a fatty alcohol, an n-alkane, or a halogen substituted n-alkane; (iv) a mono-acryloxyalkyl terminated polydiorganosiloxane macromonomer or a mono-methacryloxyalkyl terminated polydiorganosiloxane macromonomer; (v) an acrylic or methacrylic-functional polyisobutylene macromonomer prepared by reacting (A) a polyisobutylene polymer containing at least one carbon-bonded silanol group in its molecule with (B) a silane having both an acrylic or methacrylic-containing group and a silicon-bonded hydrolyzable group in its molecule; optionally (vi) a radical polymerizable monomer such as an alkyl acrylate or an alkyl methacrylate; and (vii) a free radical initiator.

Our invention also relates to the copolymer made according to the method, and to the emulsion containing the copolymer.

These and other features and objects of our invention will become apparent from a consideration of the detailed description.

BRIEF DESCRIPTION OF THE SEVERAL VIEWS OF THE DRAWING

Not applicable.

DETAILED DESCRIPTION OF THE INVENTION

A macromonomer is a polymer of molecular weight ranging from several hundred to tens of thousands, having a functional group at the chain end that can further polymerize. The term macromonomer is an abbreviation of macromolecular monomer. While the functional group may be any polymerizable group, most typically it is a vinyl group, epoxy group, dicarboxylic acid group, diol group, diamine group, acryloyl group, or a methacryloyl group.

The PIB-Macromonomer component used to prepare our copolymers is an acrylic or methacrylic-functional polyisobutylene macromonomer prepared by reacting (A) a polyisobutylene polymer containing at least one carbon-bonded silanol group in its molecule with (B) a silane having both an acrylic or methacrylic-containing group and a silicon-bonded hydrolyzable group in its molecule; or by reacting an alcohol-functional PIB and acryloyl chloride or methacryloyl chloride.

This component and methods of making it are described in detail in a prior copending application U.S. Ser. No. 08/708,070, filed Aug. 30, 1996, entitled "Polyisobutylene Polymers Having Acrylic Functionality". The prior application is assigned to the same assignee as the present invention, and is incorporated herein by reference thereto.

In general, the silanol-functional polyisobutylene polymer (A) is prepared by first silylating the corresponding allyl or vinyl-functional polyisobutylene polymer with a silane of the formula

  (ii)

followed by hydrolysis of the resulting hydrolyzable group containing functional polymer. In formula (ii), R is a hydrocarbon group with 1–14 carbon atoms or a halogenated hydrocarbon group with 1–10 carbon atoms, excluding groups containing aliphatic unsaturation; Z is a hydrolyzable group such as halogen, alkoxy, acyloxy, alkenyloxy, oximo, or aminoxy; and x is 1 or 2. Preferably, Z is chlorine. This scheme is illustrated by the following two equations, wherein "(Polymer)-" represents the polyisobutylene polymer chain residue and Z is chlorine.

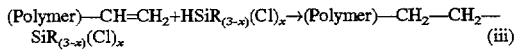
(iii)

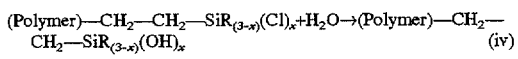
(iv)

The first of these reactions is typically catalyzed by a hydrosilylation catalyst such as platinum on carbon, chloroplatinic acid, or a platinum complex.

The silanol-functional polyisobutylene polymer (A) shown in formula (iv) is then reacted with a silane (B) of the formula

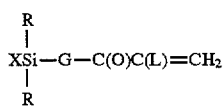
(v)

where R is as defined above; G is a difunctional alkylene oxide group having 1–4 carbon atoms, i.e., —(CH$_2$)$_n$O— where n is 1–4; and L is hydrogen or a methyl radical, corresponding to acryl and methacryl functionality, respectively. In formula (v), X is a silicon bonded hydrolyzable group capable of condensing with the silanol group of (A) to form a siloxane linkage (i.e., ≡Si—O—Si≡), or capable of hydrolyzing to form an SiOH group on silane (B), which can then condense with the SiOH of silanol-functional polymer (A), to form a siloxane linkage. These X groups may be selected from the hydrolyzable Z groups previously described in connection with silane (ii) used to prepare the silanol-functional polymer (A). Preferably X is again chlorine, and preferred silanes (v) are 3-acryloxypropyldimethylchlorosilane H$_2$C=CHCO$_2$(CH$_2$)$_3$SiCl(CH$_3$)$_2$ or 3-methacryloxypropyldimethylchlorosilane H$_2$C=C (CH$_3$)CO$_2$(CH$_2$)$_3$SiCl(CH$_3$)$_2$. The following equation illustrates this last reaction for the case where the silanol-functional polymer has the formula (iv):

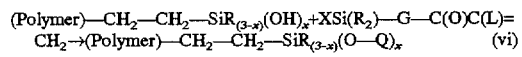
(vi)

In the above equation, Q is —Si(R$_2$)—G—C(O)C(L)=CH$_2$; and R, X, G, L and x have their previously defined meanings.

The PDMS-Macromonomer component used to prepare our copolymers can be a mono-acryloxyalkyl terminated polydiorganosiloxane macromonomer (I) or a mono-methacryloxyalkyl terminated polydiorganosiloxane macromonomer (II) having the formula

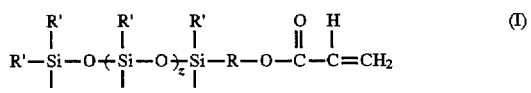
(I)

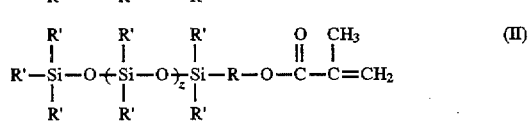
(II)

where R in each formula is a divalent hydrocarbon radical with 1–20 carbon atoms; R' in each formula is the hydrogen atom, a C$_{1-8}$ alkyl radical, a haloalkyl radical, or an aryl radical; and z in each formula is 1–1,000. These macromonomers can be prepared by methods known in the art, i.e., reacting a silanol endblocked polydimethylsiloxane with acryloxypropyldimethylchlorosilane or methacryloxypropyldimethylchlorosilane, in presence of an acid acceptor such as dibutylamine, for example.

The radical polymerizable monomer used to prepare our copolymers is preferably an acrylate monomer such as an alkyl acrylate or an alkyl methacrylate containing 1–10 carbon atoms in the alkyl chain. Examples of some suitable acrylate monomers are methyl acrylate H$_2$C=CHCO$_2$CH$_3$, ethyl acrylate H$_2$C=CHCO$_2$C$_2$H$_5$, amyl (pentyl) acrylate H$_2$C=CHCO$_2$C$_5$H$_{11}$, 2-ethylhexyl acrylate H$_2$C=CHCO$_2$CH$_2$CH (C$_2$H$_5$) (CH$_2$)$_3$CH$_3$, methyl methacrylate H$_2$C=C (CH$_3$)CO$_2$CH$_3$, ethyl methacrylate H$_2$C=C(CH$_3$)CO$_2$C$_2$H$_5$, butyl methacrylate H$_2$C=C(CH$_3$)CO$_2$(CH$_2$)$_3$CH$_3$, hexyl methacrylate H$_2$C=C(CH$_3$)CO$_2$(CH$_2$)$_5$CH$_3$, and 2-ethylhexyl methacrylate H$_2$C=C(CH$_3$)CO$_2$CH$_2$CH (C$_2$H$_5$) (CH$_2$)$_3$CH$_3$. Examples of other radical polymerizable monomers that can be used are styrene C$_6$H$_5$CH=CH$_2$, methylstyrene C$_6$H$_5$C(CH$_3$)=CH$_2$, acrylonitrile H$_2$C=CHCN, and (meth) acrylic acid H$_2$C=C(CH$_3$)CO$_2$H.

The free radical initiator can be an azo initiator conforming generally to the formula:

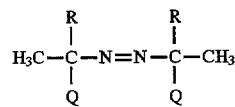

where R is an alkyl radical, and Q is a simple carboxylic acid residue or derivative thereof such as a nitrile ester.

The most preferred free radical initiator is 2,2'-azobisisobutyronitrile (AIBN) shown below:

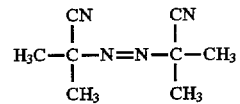

Similar initiating properties can be obtained using 4,4'-azo-4-cyanopentanoic acid (ACPA), a compound shown in the previous formula where R is —CH$_3$ and Q is —(CH$_2$)$_2$COOH. ACPA is soluble in water, unlike AIBN.

Other classes of free radical initiators can be used including dialkyl hyponitrites, diaroyl peroxides, dialkyl peroxydicarbonates, dialkyl peroxalates, dialkyl peroxides, alkyl hydroperoxides, and disulfides.

The reaction medium can contain ionic, nonionic, and mixtures of ionic and nonionic surfactants to stabilize the copolymer in the emulsion. Ionic surfactants can be cationic or anionic including surfactants known in the art as useful in emulsion polymerization.

Suitable anionic surfactants include but are not limited to sulfonic acids and their derivatives. Useful anionic surfactants are alkali metal sulfosuccinates; sulfonated glyceryl esters of fatty acids such as sulfonated monoglycerides of coconut oil acids; salts of sulfonated monovalent alcohol esters such as sodium oleyl isothionate; amides of amino sulfonic acids such as the sodium salt of oleyl methyl taurate; sulfonated products of fatty acid nitriles such as palmitonitrile sulfonate; sulfonated aromatic hydrocarbons such as sodium alpha-naphthalene monosulfonate; condensation products of naphthalene sulfonic acids with formaldehyde; sodium octahydro anthracene sulfonate; alkali metal alkyl sulfates; ether sulfates having alkyl groups of eight or more carbon atoms; and alkylaryl sulfonates having one or more alkyl groups of eight or more carbon atoms. Commercial anionic surfactants useful in our invention include dodecylbenzene sulfonic acid (DBSA) sold under the tradename BIOSOFT S-100 by Stepan Company, Northfield, Ill.; and the sodium salt of dodecylbenzene sulfonic acid sold under the tradename SIPONATE DS-10 by Alcolac Inc., Baltimore, Md.

Useful cationic surfactants are the various fatty acid amines, amides, and derivatives, and salts of fatty acid amines and amides. Cationic surfactants can be exemplified by aliphatic fatty amines and derivatives such as dodecyl amine acetate, octadecyl amine acetate, and acetates of amines of tallow fatty acids; homologues of aromatic amines having fatty chains such as dodecyl aniline; fatty amides derived from aliphatic diamines such as undecyl imidazoline; fatty amides derived from di-substituted amines such as oleylamino diethylamine; derivatives of ethylene diamine; quaternary ammonium compounds such as tallow trimethylammonium chloride, dioctadecyldimethyl ammonium chloride, didodecyldimethyl ammonium chloride, and dihexadecyldimethyl ammonium chloride; amide derivatives of amino alcohols such as beta-hydroxyethyl stearyl amide; amine salts of long chain fatty acids; quaternary ammonium bases derived from fatty amides of di-substituted diamines such as oleylbenzylamino ethylene diethylamine hydrochloride; quaternary ammonium bases of benzimidazolines such as methylheptadecyl benzimidazole hydrobromide; basic compounds of pyridinium and derivatives such as cetylpyridinium chloride; sulfonium compounds such as octadecyl sulfonium methyl sulfate; quaternary ammonium compounds of betaine such as betaine compounds of diethylamino acetic acid, and octadecylchloromethyl ether; urethanes of ethylene diamine such as condensation products of stearic acid and diethylene triamine; polyethylene diamines; and polypropanol polyethanol amines. Commercial cationic surfactants include products sold under the tradenames ARQUAD T-27W, 16–29, C-33, T-50; and ETHOQUAD T/13 and T/13 ACETATE; by Akzo Chemicals Inc., Chicago, Ill. The anionic or cationic surfactant is present at 0.05–30% by weight of total emulsion, preferably 0.5–20%.

Useful nonionic surfactants have a hydrophilic-lipophilic balance (HLB) of 10–20. Nonionic surfactants with HLB of less than 10 may be used but hazy solutions may result due to limited solubility of the nonionic surfactant in water. When using a nonionic surfactant with HLB less than 10, a nonionic surfactant with HLB greater than 10 should be added during or after polymerization. Commercial nonionic surfactants can be exemplified by 2,6,8-trimethyl-4-nonyloxy polyethylene oxyethanols (6EO) and (10EO) sold under the trademarks TERGITOL® TMN-6 and TERGITOL® TMN-10; alkyleneoxy polyethylene oxyethanol ($C_{11-15}$ secondary alcohol ethoxylates 7EO, 9EO, and 15EO) sold under the trademarks TERGITOL® 15-S-7, TERGITOL® 15-S-9, TERGITOL® 15-S-15; other $C_{11-15}$ secondary alcohol ethoxylates sold under the trademarks TERGITOL® 15-S-12, 15-S-20, 15-S-30, 15-S-40; and octylphenoxy polyethoxy ethanol (40EO) sold under the trademark TRITON® X-405. All of these surfactants are sold by Union Carbide Corporation, Danbury, Conn. Other commercial nonionic surfactants are nonylphenoxy polyethoxy ethanol (10EO) sold under the tradename MAKON 10 by Stepan Company, Northfield, Ill. One especially useful nonionic surfactant is polyoxyethylene 23 lauryl ether (Laureth-23) sold commercially under the tradename BRIJ 35 by ICI Surfactants, Wilmington, Del.

Some commercially available ionic surfactants have characteristics of both ionic and nonionic surfactants combined, and can be used. One example is methyl polyoxyethylene (15) octadecyl ammonium chloride, sold under the tradename ETHOQUAD 18/25 by Akzo Chemicals Inc., Chicago, Ill.

A cosurfactant is optional, but can be used in the method according to our invention. The cosurfactant is preferably a hydrophobic solvent or a compound having low water solubility. Representative cosurfactants are, for example, fatty alcohols such as cetyl alcohol $C_{16}H_{33}OH$; and n-alkanes such as n-hexadecane (cetane) $C_{16}H_{34}$ or the halogen substituted derivatives such as 1-chlorodecane (decyl chloride) $CH_3(CH_2)_9Cl$. The presence of such a low molecular weight and relatively water-insoluble compound retards diffusion of monomer out of the droplets.

The reaction mixture is formed by combining 50–80 percent by weight of water; 5–15 percent by weight of the surfactant(s); 1–5 percent by weight of the cosurfactant(s); 10–50 percent by weight of the macromonomer(s) or monomer(s); and 0.5–15 percent by weight of the free radical initiator. It is not essential that these ingredients be combined in any given order, although one preferred procedure is to combine water, surfactant(s), and cosurfactant (s), followed by addition of monomer(s) and initiator. However, it is essential to have agitation during and following addition of the ingredients, and to have achieved or to heat to the polymerization temperature as the ingredients are combined. Where practical, agitation and heating should be continued until the monomer(s) is consumed in forming the emulsion.

The process we used for making miniemulsions is similar to the El-Aasser et al procedure; although our initiator was not the same as the initiator used by El-Aasser et al.

According to our process, sodium lauryl sulfate, cetyl alcohol, and water, were first heated at 65° C. for 2 hours, cooled to 30°–35° C., and passed through a high shear device to break the gel which formed. The high shear device we employed was a high pressure impingement emulsifier, sold under the trademark MICROFLUIDIZER®, by Microfluidics Corporation, Newton, Mass.

Such high shear devices are described in detail in, for example, U.S. Pat. No. 4,533,254, (Aug. 6, 1985), which is incorporated herein by reference. In general, these high shear devices include a high pressure pump (i.e., as much as 25,000 psi/172,370 kPa), and an interaction chamber where emulsification occurs. A reaction mixture is passed through the emulsifier once at a pressure between 5,000–15,000 psi/34,474–103,422 kPa. Multiple passes through the high shear device result in smaller average particle size, and a narrower range for the particle size distribution.

The macromonomer(s) and the AIBN initiator were then added to the surfactant mixture and stirred at ambient/room temperature (20°–25° C./68°–77° F.). The mixture was again introduced to the MICROFLUIDIZER® and passed 10 times at 8,000–14,000 psi/55,158–96,527 kPa. Particle size was measured with the aid of a NICOMP particle size analyzer in dilute solutions. The emulsion was transferred to a 3-neck flask, and after bubbling nitrogen, the emulsion was heated at 60°–65° C. for a period of time.

After polymerization was completed, the emulsion was broken by adding sodium chloride and methanol. The precipitate was separated from the mixture by filtration and dried in vacuum. Molecular weight of each starting polyisobutylene (PIB) macromonomer and polydimethylsiloxane (PDMS) macromonomer was determined by Gel Permeation Chromatography (GPC), in toluene or tetrahydrofuran (THF) using standard PIB samples or PDMS samples, respectively, for molecular weight calibration, and a Refractive Index (RI) detector. The copolymers were further analyzed and characterized by GPC, IR, $^{13}$C and $^{29}$Si Nuclear Magnetic Resonance (NMR) to confirm molecular structure.

Our invention is illustrated in more detail in the following examples. All reactions were carried out in an atmosphere of nitrogen. GPC analyses were performed on a WATERS 150C Chromatograph, using a flow rate of 1.2 ml/minute and an injection volume of 200 μl. IR spectra were measured on neat liquids in KBr plates on a Perkin Elmer Spectrophotometer. Particle size measurements were made with a NICOMP 370 particle size analyzer. All parts and percentages in these examples are on a weight basis, and all measurements were obtained at 25° C. unless indicated to the contrary. Averages of molecular weight such as the number-average molecular weight $M_n$, and the weight-average molecular weight $M_w$, are used to describe the general shape of the molecular weight distribution.

EXAMPLE 1

Preparation of PIB-Macromonomer

Glissopal® 1000 was hydrosilylated with dimethylchlorosilane $(CH_3)_2HSiCl$ as follows. Glissopal® 1000 is described as a polyisobutylene having a high proportion of terminal double bonds, and having a number average molecular weight of about 1,180. It is a product and trademark of BASF AG, Ludwigshafen, Germany. Glissopal® 1000 (400 gm) was charged to a three-neck flask fitted with a magnetic stirring bar, condenser, and dropping funnel. A reaction product of chloroplatinic acid and 1,3-divinyltetramethyldisiloxane $H_2C=CH(CH_3)_2SiOSi(CH_3)_2CH=CH_2$ (200 μl of catalyst prepared according to U.S. Pat. No. 3,419,593 to Willing) was added, and the solution was heated to 70° C. under an atmosphere of nitrogen. Dimethylchlorosilane was added dropwise. The addition rate of silane was then controlled so as to maintain a reaction temperature of 65°–70° C. (total silane added was 76 g). The solution was stirred overnight at 70°–75° C. and the solvent and excess silane were stripped off in a rotary evaporator at 85°–90° C./2–5 torr/3 hours. A pale yellow polymer was obtained. NMR analysis confirmed a PIB polymer wherein the vinyl functionality was quantitatively converted to end groups of the formula —Si(Me$_2$)Cl, in which Me hereinafter represents a methyl radical.

The resulting hydrosilylated product (105 g) was dissolved in 225 g of THF. Sodium bicarbonate solution (10% in water, 100 g) was slowly added. The mixture was shaken vigorously for 2–3 minutes. The water and organic layers were separated, and the organic layer was dried over Na$_2$SO$_4$ for 10 minutes. The salt byproduct was filtered through a pressure filter, and the solvent was removed by vacuum distillation. A pale yellow polymeric material was obtained. IR and $^{29}$Si NMR showed the presence of SiOH groups, but showed little of the ≡Si—O—Si≡ structure. $M_w$ at this point was 2,180 and $M_n$ was 1,500.

The above described SiOH-functional PIB (97 g, 0.08 mole) was dissolved in tetrahydrofuran (125 g), and this solution was charged to a 500 ml 3-neck flask equipped with a magnetic stirring bar and a nitrogen purge. Triethylamine (12.24 g, 0.12 mole) was added under an atmosphere of nitrogen. 3-Methacryloxypropyldimethylchlorosilane (18 g, 0.08 mole) was slowly added, and the mixture was stirred overnight at room temperature. This product was filtered through a pressure filter, and the solvent and excess reactants were removed by vacuum distillation. A pale yellow polymeric material was obtained which had a $M_w$ of 2,070 and $M_n$ of 1,540. It had a structure consistent with the formula

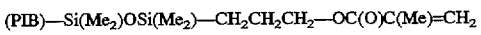

(PIB)—Si(Me$_2$)OSi(Me$_2$)—CH$_2$CH$_2$CH$_2$—OC(O)C(Me)=CH$_2$ wherein PIB represents the residue of the polyisobutylene chain. This PIB-Macromonomer was used in Examples 4 and 5.

EXAMPLE 2

Preparation of PIB-Macromonomer

The procedure of Example 1 was used to prepare another PIB-Macromonomer. In this example, the SiOH-functional PIB (8 g) was dissolved in tetrahydrofuran (15 g), and this solution was charged to a 100 ml 3-neck flask equipped with a magnetic stirring bar and a nitrogen purge. Triethylamine (1 g) was added under an atmosphere of nitrogen.

3-Methacryloxypropyldimethylchlorosilane (2 g) was slowly added, and the mixture was stirred overnight at room temperature. This product was filtered through a pressure filter, and the solvent and excess reactants were removed by vacuum distillation. A pale yellow polymeric material was obtained which had a $M_w$ of 2,277 and $M_n$ of 1,630. It had a structure consistent with the formula

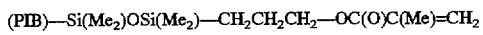

(PIB)—Si(Me$_2$)OSi(Me$_2$)—CH$_2$CH$_2$CH$_2$—OC(O)C(Me)=CH$_2$ wherein PIB represents the residue of the polyisobutylene chain. This PIB-Macromonomer was used in Example 6.

EXAMPLE 3

Preparation of PDMS-Macromonomer

A mono-SiOH-functional polydimethylsiloxane (PDMS) (500 g) was charged to a one liter 3-neck flask equipped with a magnetic stirring bar and a nitrogen purge. Dibutylamine (10.5 g) was added under an atmosphere of nitrogen.

3-Methacryloxypropyldimethylchlorosilane (13.25 g) was slowly added, and the mixture was stirred overnight at room temperature. This product was filtered through a pressure filter, and the solvent and excess reactants were removed by vacuum distillation. An off white polymeric material was obtained which had a $M_w$ of 13,530 and $M_n$ of 12,650. It had a structure consistent with the formula

(PDMS)—Si(Me$_2$)OSi(Me$_2$)—CH$_2$CH$_2$CH$_2$—OC(O)C(Me)=CH$_2$ wherein PDMS represents the residue of the polydimethylsiloxane chain. This PDMS-Macromonomer is used in Examples 4 and 5.

EXAMPLE 4

Preparation of Copolymer of PIB-Macromonomer and PDMS-Macromonomer

Deionized water (160 gm) was taken in a 250 ml beaker provided with a magnetic stirrer. Sodium laurel sulfate (0.2 gm) and cetyl alcohol (0.8 gm) were added to the water, and the contents were heated to 65°–67° C. for 2 hours. The contents were allowed to cool to 30°–35° C. and a white gel-like material was obtained. The gel-like material was introduced to a MICROFLUIDIZER® and the contents were circulated at 5,000–6,000 psi/34,474–41,369 kPa. The PDMS-Macromonomer (20 gm) prepared in Example 3, and the PIB-Macromonomer (20 gm) prepared in Example 1, were added and the contents stirred for 30 minutes with a magnetic stirrer. At this point, AIBN (2,2'-azobisisobutyronitrile, 0.45 gm) was added. The mixture was again introduced to the MICROFLUIDIZER® and cycled at least 10 times at 8,000 psi/55,158 kPa. The average particle size was 303 nm. The emulsion was transferred to a 3-neck flask fitted with a nitrogen inlet, condenser, and thermometer. Nitrogen was bubbled through the solution. The emulsion was heated at 65° C. for 24 hours. More AIBN was added (0.2 g) after 24 and 48 hours, and the heating was continued for a total of 72 hours. Some whitish gray precipitate appeared which was filtered. The precipitate was insoluble in toluene. The emulsion was broken by pouring it into methanol (600 gm) and a solution of NaCl in water (5 gm in 25 ml). The mixture was shaken vigorously and filtered. A white precipitate was obtained which was dissolved in hexane and dried over $MgSO_4$. It was filtered and the solvent was removed. An off white highly viscous polymer was obtained. GPC: in THF; Mn=50050, Mw=147700.

EXAMPLE 5

Preparation of Copolymer of PIB-Macromonomer, PDMS-Macromonomer, and Acrylate Monomer Deionized water (160 gm) was taken in a 250 ml beaker equipped with a magnetic stirrer. Sodium laurel sulfate (0.2 gm) and cetyl alcohol (0.8 gm) were added to the water, and the contents were heated to 65°–67° C. for 2 hours. The contents were allowed to cool to 30°–35° C. and a white gel-like material was obtained. The gel-like material was introduced to the MICROFLUIDIZER®, and the contents were circulated at least 5 times at 10,000 psi/68,948 kPa. The PDMS-Macromonomer (10 gm) prepared in Example 3, methyl methacrylate (20 gm), and the PIB-Macromonomer (10 gm) prepared in Example 1, were added and the contents stirred for 30 minutes with a magnetic stirrer. At this point, AIBN (0.6 gm) was added. The mixture was again introduced to the MICROFLUIDIZER®and cycled at least 10 times at 12,000 psi/82,738 kPa. The average particle size was 395 nm. The emulsion was transferred to a 3-neck flask fitted with a nitrogen inlet, condenser, and thermometer. Nitrogen was bubbled through the solution. The emulsion was heated at 65° C. for 24 hours. More AIBN was added (0.2 g) after 24 and 48 hours, and the heating was continued for a total of 72 hours. The emulsion was broken by pouring it into methanol (800 gm) and a solution of NaCl in water (5 gm in 25 ml). The mixture was shaken vigorously and filtered. A white solid was obtained which was dried in vacuum. GPC: in Toluene; Mn=71030, Mw=127100.$^{13}C$ NMR data showed that the product was a copolymer of the PIB-Macromonomer, the PDMS-Macromonomer, and methyl methacrylate.

EXAMPLE 6

Preparation of Copolymer of PIB-Macromonomer, PDMS-Macromonomer, and Acrylate Monomer Deionized water (150 gm) was taken in a 250 ml beaker equipped with a magnetic stirrer. Sodium laurel sulfate (0.2 gm) and cetyl alcohol (0.8 gm) were added to the water, and the contents were heated to 65°–67° C. for 2 hours. The contents were allowed to cool to 30°–35° C. and a white gel-like material was obtained. The gel-like material was introduced to the MICROFLUIDIZER®, and the contents were circulated at least 5 times at 10,000 psi/68,948 kPa. The PDMS-Macromonomer (5 gm) prepared in Example 3, methyl methacrylate (40 gm), and the PIB-Macromonomer (5 gm) prepared in Example 2, were added and the contents stirred for 30 minutes with a magnetic stirrer. At this point, AIBN (0.42 gm) was added. The mixture was again introduced to the MICROFLUIDIZER®, and cycled at least 10 times at 14,000 psi/96,527 kPa. The particle size was 171 nm. The emulsion was transferred to a 3-neck flask fitted with a nitrogen inlet, condenser, and thermometer. Nitrogen was bubbled through the solution. The emulsion was heated at 65° C. for 45 hours. The average particle size was 192 nm. The emulsion was broken by pouring it into methanol (400 gm) and a solution of NaCl in water (5 gm in 25 ml). The mixture was shaken vigorously. A white solid was obtained which was filtered and dried in vacuum. GPC: in THF; Mn=137900, Mw=505300.$^{13}C$ NMR data showed that the product was a copolymer of the PIB-Macromonomer, the PDMS-Macromonomer, and methyl methacrylate.

The preparation of copolymers of (i) an acrylic or methacrylic-functional polyisobutylene macromonomer, (ii) a polydiorganosiloxane macromonomer, and optionally (iii) a radical polymerizable monomer such as an alkyl acrylate or alkyl methacrylate, in emulsion form provides many advantages and benefits. For example, the miniemulsion polymerization process herein provides a technique where monomers can be polymerized to high molecular weight copolymers, and yet the emulsions are very stable. The resulting water-based emulsions provide low content of volatile organic compound (VOC), and allow for ease of handling of the copolymers.

These copolymers have applications in the personal care arena, i.e. in cosmetics; as well as in ink, paint, and coating industries. Typically, the emulsions are used without first extracting the copolymer; and this is convenient for use in water-based products, especially in personal care. The result is a significant savings in cost of production.

Other variations may be made in compounds, compositions, and methods described herein without departing from the essential features of our invention. The forms of our invention are exemplary only and not intended as limitations on its scope as defined in the appended claims.

We claim:

1. A method of making a copolymer in an emulsion comprising heating and shearing a reaction mixture formed by combining (i) water; (ii) an anionic surfactant, a cationic surfactant, a nonionic surfactant, or a combination thereof; optionally (iii) a cosurfactant which is a hydrophobic solvent, or a compound selected from the group consisting of fatty alcohols, n-alkanes, and halogen substituted n-alkanes; (iv) a mono-acryloxyalkyl terminated polydiorganosiloxane macromonomer (I) or a mono-methacryloxyalkyl terminated polydiorganosiloxane macromonomer (II) having the formula

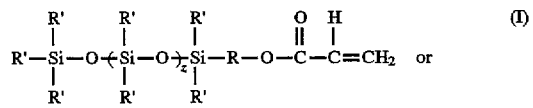

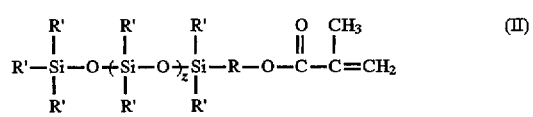

where R in each formula is a divalent hydrocarbon radical with 1–20 carbon atoms; R' in each formula is the hydrogen atom, a $C_{1-8}$ alkyl radical, a haloalkyl radical, or an aryl radical; and z in each formula is 1–1,000; (v) an acrylic or methacrylic-functional polyisobutylene macromonomer; optionally (vi) a radical polymerizable monomer; and (vii) a free radical initiator.

2. A method according to claim 1 in which the cosurfactant is a compound selected from the group consisting of cetyl alcohol, n-hexadecane, and 1-chlorodecane.

3. A method according to claim 1 in which the free radical initiator is an azo initiator.

4. A method according to claim 3 in which the free radical azo initiator is a compound having the formula

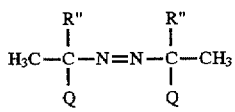

where R" is an alkyl radical, and Q is a carboxylic acid residue.

5. A method according to claim 4 in which the free radical initiator is 2,2'-azobisisobutyronitrile or 4,4'-azo-4-cyanopentanoic acid.

6. A method according to claim 1 in which the radical polymerizable monomer is an alkyl acrylate or an alkyl methacrylate selected from the group consisting of methyl acrylate, ethyl acrylate, amyl acrylate, 2-ethylhexyl acrylate, methyl methacrylate, ethyl methacrylate, butyl methacrylate, hexyl methacrylate, and 2-ethylhexyl methacrylate.

7. A method according to claim 1 in which the acrylic or methacrylic-functional polyisobutylene macromonomer is prepared by reacting (A) a polyisobutylene polymer containing at least one carbon-bonded silanol group in its molecule with (B) a silane having both an acrylic or methacrylic-containing group and a silicon-bonded hydrolyzable group in its molecule.

8. A method according to claim 7 in which silanol containing polyisobutylene polymer (A) is prepared by first silylating an allyl or vinyl-functional polyisobutylene polymer with a silane of the formula HSiR'''$_{(3-x)}$(Z)$_x$ where R''' is a hydrocarbon group with 1–14 carbon atoms or a halogenated hydrocarbon group with 1–10 carbon atoms, excluding groups containing aliphatic unsaturation; Z is a hydrolyzable group selected from the group consisting of halogen, alkoxy, acyloxy, alkenyloxy, oximo, and aminoxy; and x is 1 or 2; followed by hydrolysis of the resulting hydrolyzable group containing polyisobutylene polymer.

9. A method according to claim 7 in which silane (B) is a compound having the formula

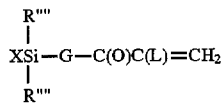

where R"" is a hydrocarbon group with 1–14 carbon atoms or a halogenated hydrocarbon group with 1–10 carbon atoms, excluding groups containing aliphatic unsaturation; G is a difunctional alkylene oxide group having 1–4 carbon atoms; L is hydrogen or a methyl radical; and X is a silicon bonded hydrolyzable group selected from the group consisting of halogen, alkoxy, acyloxy, alkenyloxy, oximo, and aminoxy.

10. A method according to claim 1 in which the reaction mixture is formed by combining 50–80 percent by weight of water, 5–15 percent by weight of surfactant, 1–5 percent by weight of cosurfactant, 10–50 percent by weight of macromonomers and monomer, and 0.5–15 percent by weight of free radical initiator.

11. A copolymer made according to the method defined in claim 1.

12. An emulsion containing a copolymer made according to the method defined in claim 1.

* * * * *